United States Patent
Huang et al.

(10) Patent No.: US 8,488,025 B2
(45) Date of Patent: Jul. 16, 2013

(54) SUB-FRAME TAPERED RESET

(75) Inventors: Ying Huang, Newbury Park, CA (US); Giuseppe Rossi, Los Angeles, CA (US); Lester Joseph Kozlowski, Simi Valley, CA (US); Laurent Blanquart, Westlake Village, CA (US); Qianjiang Mao, Chino Hills, CA (US); Gregory Chow, Camarillo, CA (US)

(73) Assignee: AltaSens, Inc, Westlake Village, CA (US)

( * ) Notice: Subject to any disclaimer, the term of this patent is extended or adjusted under 35 U.S.C. 154(b) by 580 days.

(21) Appl. No.: 12/582,316

(22) Filed: Oct. 20, 2009

(65) Prior Publication Data

US 2011/0090374 A1    Apr. 21, 2011

(51) Int. Cl.
*H04N 5/217*    (2011.01)
*H04N 5/335*    (2011.01)

(52) U.S. Cl.
USPC .......................................... 348/241; 348/308

(58) Field of Classification Search
USPC .. 348/294, 308, 301, 317, 302, 310; 257/292, 257/293; 250/208.1, 339.02
See application file for complete search history.

(56) References Cited

U.S. PATENT DOCUMENTS

| | | | | |
|---|---|---|---|---|
| 5,955,753 A * | 9/1999 | Takahashi | ..................... | 257/292 |
| 5,990,471 A * | 11/1999 | Watanabe | .................. | 250/208.1 |
| 6,091,449 A * | 7/2000 | Matsunaga et al. | ........... | 348/308 |
| 6,529,242 B1 * | 3/2003 | Panicacci | ..................... | 348/308 |
| 6,630,957 B1 * | 10/2003 | Kuroda et al. | ................ | 348/296 |
| 6,777,660 B1 | 8/2004 | Lee | | |
| 6,809,766 B1 * | 10/2004 | Krymski et al. | .............. | 348/296 |
| 6,847,398 B1 * | 1/2005 | Fossum | ........................ | 348/296 |
| 6,867,806 B1 * | 3/2005 | Lee et al. | ...................... | 348/308 |
| 6,888,572 B1 | 5/2005 | Kozlowski | | |
| 6,947,088 B2 * | 9/2005 | Kochi | ........................... | 348/308 |
| 6,956,605 B1 * | 10/2005 | Hashimoto | ................... | 348/301 |
| 6,992,714 B1 * | 1/2006 | Hashimoto et al. | ........... | 348/273 |
| 7,057,147 B1 * | 6/2006 | Yu | .............................. | 250/208.1 |
| 7,087,883 B2 * | 8/2006 | He et al. | .................... | 250/214 R |
| 7,129,985 B1 * | 10/2006 | Koizumi et al. | .............. | 348/372 |
| 7,382,407 B2 * | 6/2008 | Cho et al. | ..................... | 348/296 |
| 7,538,304 B2 * | 5/2009 | Ladd | ............................. | 250/200 |
| 7,573,516 B2 * | 8/2009 | Krymski et al. | .............. | 348/296 |
| 7,602,430 B1 | 10/2009 | Merrill | | |
| 7,608,516 B2 * | 10/2009 | Meynants | ..................... | 438/308 |

(Continued)

OTHER PUBLICATIONS

International Search Report & Written Opinion for PCT Application Serial No. PCT/US2010/053226, mailed Jan. 18, 2011, 12 pages.

*Primary Examiner* — Aung S Moe
(74) *Attorney, Agent, or Firm* — Turocy & Watson, LLP

(57) ABSTRACT

Systems and methods are provided that facilitate employing a plurality of independent reset buses for a column of pixels in a pixel array of a CMOS sensor imager. Utilization of the plurality of independent reset buses for the column of pixels can enable independent reset to be effectuated when employing sub-frame integration. For example, rows to be read and reset during a given readout time interval can be selected based upon one or more criteria. Further, each of the rows selected during the given readout time interval can be associated with a respective distinct reset bus. By leveraging the plurality of independent reset buses, uniformity in pixel operation can be maintained whether operating in full frame integration mode or sub-frame integration mode. Thus, noise resultant from changing between integration modes can be mitigated by using the plurality of independent reset buses.

20 Claims, 9 Drawing Sheets

U.S. PATENT DOCUMENTS

| | | | |
|---|---|---|---|
| 7,825,966 B2* | 11/2010 | Manabe et al. | 348/248 |
| 7,948,537 B2* | 5/2011 | Chou | 348/296 |
| 8,098,314 B2* | 1/2012 | Mandelli | 348/308 |
| 8,144,226 B2* | 3/2012 | Shah et al. | 348/303 |
| 2001/0005225 A1* | 6/2001 | Clark et al. | 348/302 |
| 2004/0096124 A1* | 5/2004 | Nakamura | 382/308 |
| 2005/0280729 A1* | 12/2005 | Sekine | 348/308 |
| 2006/0208163 A1* | 9/2006 | Manabe et al. | 250/208.1 |
| 2006/0256221 A1* | 11/2006 | Mckee et al. | 348/308 |
| 2007/0063127 A1* | 3/2007 | Bock | 250/208.1 |
| 2008/0018559 A1* | 1/2008 | Ochi | 345/59 |
| 2008/0055439 A1 | 3/2008 | Mabuchi | |
| 2008/0135895 A1 | 6/2008 | Lee | |
| 2008/0291309 A1* | 11/2008 | Gruev et al. | 348/308 |
| 2009/0147120 A1* | 6/2009 | Kurane | 348/311 |
| 2009/0316031 A1* | 12/2009 | Wakamori | 348/308 |
| 2010/0149390 A1* | 6/2010 | Huang et al. | 348/294 |
| 2011/0109670 A1* | 5/2011 | Sempel et al. | 345/692 |

* cited by examiner

SUB-FRAME TAPERED RESET

BACKGROUND

Recent technological advances have led to complementary metal-oxide-semiconductor (CMOS) sensor imagers being leveraged by cameras, video systems, and the like. CMOS sensor imagers can include an integrated circuit with an array of pixel sensors, each of which can comprise a photodetector. Moreover, a CMOS sensor imager can be incorporated into a System-on-Chip (SoC). As such, the SoC can integrate various components (e.g., analog, digital, . . . ) associated with imaging into a common integrated circuit. For instance, the SoC can include a microprocessor, microcontroller, or digital signal processor (DSP) core, memory, analog interfaces (e.g., analog to digital converters, digital to analog converters), and so forth.

Visible imaging systems implemented using CMOS imaging sensors can reduce costs, power consumption, and noise while improving resolution. For instance, cameras can use CMOS imaging System-on-Chip (iSoC) sensors that efficiently marry low-noise image detection and signal processing with multiple supporting blocks that can provide timing control, clock drivers, reference voltages, analog to digital conversion, digital to analog conversion and key signal processing elements. High-performance video cameras can thereby be assembled using a single CMOS integrated circuit supported by few components including a lens and a battery, for instance. Accordingly, by leveraging iSoC sensors, camera size can be decreased and battery life can be increased. Also, dual-use cameras have emerged that can employ iSoC sensors to alternately produce high-resolution still images or high definition (HD) video.

A CMOS imaging sensor can include an array of pixel cells, where each pixel cell in the array can include a photodetector (e.g., photogate, photoconductor, photodiode, . . . ) that overlays a substrate for yielding a photo-generated charge. A readout circuit can be provided for each pixel cell and can include at least a source follower transistor. The pixel cell can also include a floating diffusion region connected to a gate of the source follower transistor. Accordingly, charge generated by the photodetector can be sent to the floating diffusion region. Further, the imaging sensor can include a transistor for resetting the floating diffusion region to a predetermined voltage level prior to charge transference.

In a CMOS imaging sensor, pixel cells in the pixel array are light collecting devices controlled by circuits of digitally controlled transistors. Various light integration modes can be employed by the CMOS imaging sensor. For instance, in full frame integration mode, each pixel cell can be integrated or exposed to a light source at times during the duration of a full frame time except when the pixel is being read and reset. This mode can allow for the maximum amount of light to be integrated in each pixel cell, which can provide high signal integration. Further, in sub-frame integration mode, each pixel cell can be integrated or exposed to a light source for a period of time that is less than a full frame time while maintaining the same frame rate as for the full frame integration mode.

Pixel cells are reset in the course of operation, which is oftentimes effectuated by opening a circuit to a voltage source via digital control to yield a current draw. When employing full frame integration mode, one row of pixel cells can be reset during a particular time period. However, when sub-frame integration mode is effectuated, multiple rows of pixel cells can be reset during a common time period. Typical approaches leveraged for resetting pixel cells oftentimes employ a common current source. Thus, concurrent resetting of more than one pixel cell from differing rows in the pixel array can be infeasible with conventional techniques when sub-frame integration mode is utilized since a current supplied to each of these pixel cells can be split as compared to a current provided to a pixel cell during reset for full frame integration mode (e.g., where one pixel cell is reset during a given time period, . . . ). Accordingly, these typical approaches can yield artifacts that degrade resultant images.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate employing a plurality of independent reset buses for a column of pixels in a pixel array of a CMOS sensor imager. Utilization of the plurality of independent reset buses for the column of pixels can enable independent reset to be effectuated when employing sub-frame integration. For example, rows to be read and reset during a given readout time interval can be selected based upon one or more criteria. Further, each of the rows selected during the given readout time interval can be associated with a respective distinct reset bus. By leveraging the plurality of independent reset buses, uniformity in pixel operation can be maintained whether operating in full frame integration mode or sub-frame integration mode. Thus, noise resultant from changing between integration modes can be mitigated by using the plurality of independent reset buses.

According to various aspects, a first reset bus can be connected to a first subset of pixels in a column of a pixel array. Further, a second reset bus can be connected to a second subset of pixels in the column of the pixel array. Moreover, the first subset of pixels and the second subset of pixels can be mutually exclusive.

By way of another example, a pointer control component can choose rows from a pixel array to be read and reset during a given readout time interval based upon one or more criteria. Examples of the one or more criteria can include an integration mode, a length of integration time, a clock mode, a scanning mode, a resolution, a predefined structure of the pixel array, or the like. Moreover, the pointer control component can be constrained to choose rows to be read and reset to inhibit more than one pixel in a column from concurrently accessing a common reset bus during the given readout time interval.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
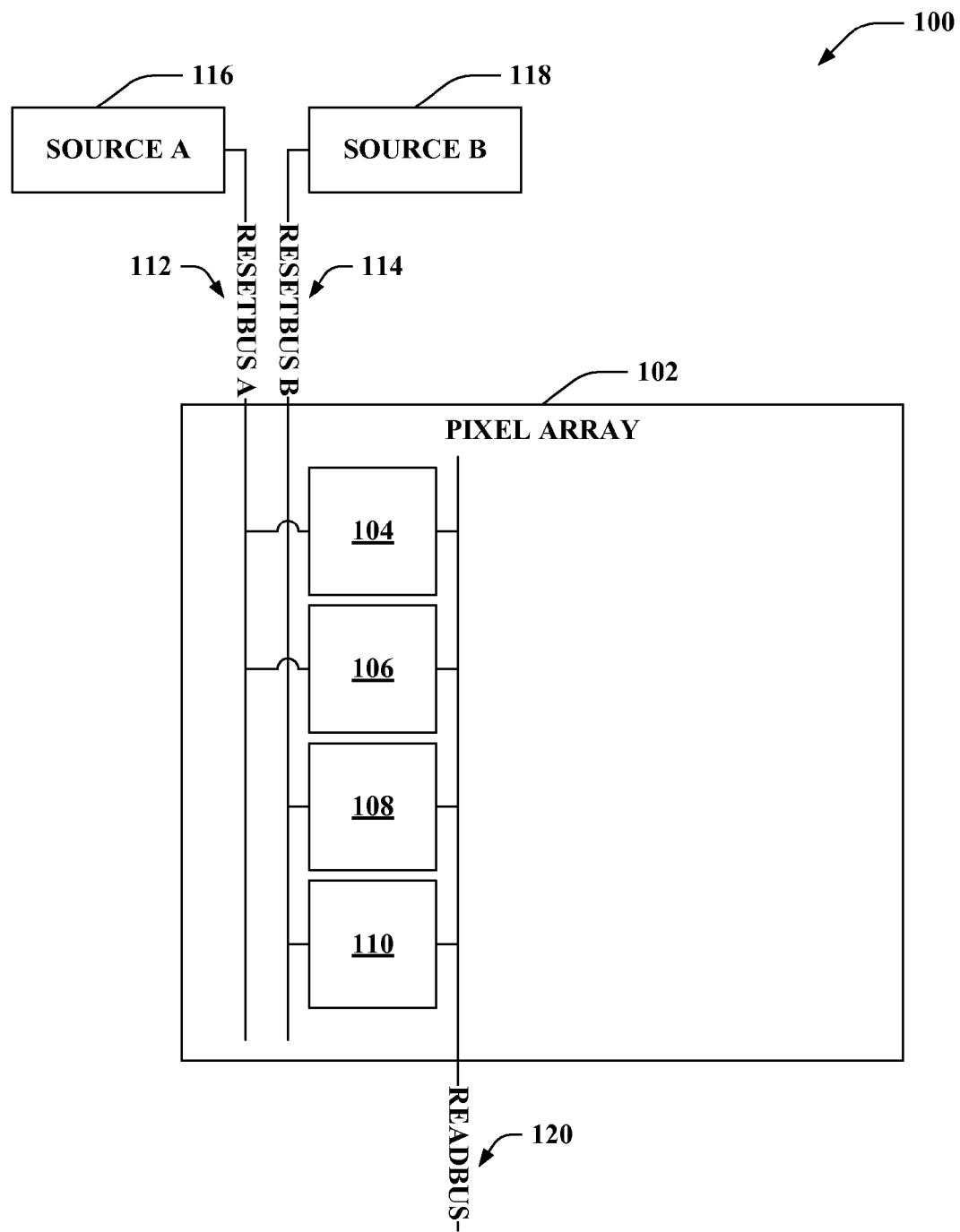
FIG. 1 illustrates a block diagram of an example system that resets pixels in a complementary metal-oxide-semiconductor (CMOS) sensor imager.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

With reference to FIG. 1, illustrated is a system 100 that resets pixels in a complementary metal-oxide-semiconductor (CMOS) sensor imager. The system 100 can be associated with a CMOS sensor imager utilized in connection with a camcorder, digital camera, microscope, video system, and/or the like. The system 100 comprises a pixel array 102 that can include M rows and N columns of pixel cells (e.g., pixels, . . . ), where M and N can be any integers. Each pixel in the pixel array 102 can comprise a photodetector (e.g., photogate, photoconductor, photodiode, . . . ). Further, each pixel in the pixel array 102 can be utilized to detect a particular color of light; thus, a subset of the pixels in the pixel array 102 can operate in response to red light (R pixels), a disparate subset of the pixels can operate based upon blue light (B pixels) and a further subset of the pixels can operate as a function of green light (G pixels). Other color filter patterns are also possible. Additionally, broader light wavelengths beyond the visible spectrum are also possible. It is to be appreciated, however, that the claimed subject matter is not limited to the foregoing.

The pixel array 102 can include substantially any number of pixels (e.g., M rows and N columns of pixels, . . . ). For illustration purposes, four pixels (e.g., pixel 104, pixel 106, pixel 108, and pixel 110) are depicted as being included in the pixel array 102. The four pixels 104-110 are positioned in a common column within the pixel array 102. Further, the four pixels 104-110 are located in four adjacent rows within the pixel array 102. It is to be appreciated that the discussion herein related to the four pixels 104-110 can be extended to a remainder of the pixels in the pixel array 102.

Moreover, the system 100 includes two reset buses: reset bus A 112 and reset bus B 114. The reset bus A 112 can be coupled to a source A 116 and the reset bus B 114 can be coupled to a source B 118. The reset bus A 112 can be connected to a first subset of pixels in the pixel array 102, and the reset bus B 114 can be connected to a second subset of pixels in the pixel array 102, where the first subset of pixels and the second subset of pixels can be mutually exclusive. For instance, the reset bus A 112 can be connected to pixels in two adjacent rows (e.g., pixel 104 and pixel 106, . . . ) and the reset bus B 114 can be connected to pixels in a disparate two adjacent rows (e.g., pixel 108 and pixel 110, . . . ) such that each pixel 104-110 can be connected to one of the reset buses 112-114. Further, although not shown, it is contemplated that this pattern can be repeated in the pixel array 102. For instance, four disparate adjacent pixels in the same column and adjacent to the pixels 104-110 can include two pixels connected to the reset bus A 112 and two pixels connected to the reset bus B 114. Thus, eight adjacent pixels in the given column can include a first group of two adjacent pixels (e.g., pixel 104 and pixel 106, . . . ) that can be coupled to the reset bus A 112, a second group of two adjacent pixels (e.g., pixel 108 and pixel 110, ...) that can be coupled to the reset bus B 114, a third group of two adjacent pixels that can be coupled to the reset bus A 112, and a fourth group of two adjacent pixels that can be coupled to the reset bus B 114, where the first group is adjacent to the second group, the second group is also adjacent to the third group, and the third group is also adjacent to the fourth group.

The pixels 104-110 can further be coupled to a read bus 120. Accordingly, when a row that includes the pixel 104 is reset, a reset path is from the reset bus A 112 through the pixel array 102 (e.g., pixel 104, ...) and out on the read bus 120. Pursuant to another illustration, when a row that includes the pixel 108 is reset, a reset path is from the reset bus B 114 through the pixel array 102 (e.g., pixel 108, ...) and out on the read bus 120.

The reset bus A 112 and the reset bus B 114 are independent of each other, and each connect to a respective source 116-118. Utilization of separate reset buses 112-114 enables more than one pixel to be reset concurrently. Thus, differing integration modes can be supported by the system 100. By way of example, full frame integration or sub-frame integration can be effectuated by utilizing the system 100. According to an illustration, for full frame integration, one row of pixels (e.g., one of the pixels 104-110, ...) can be reset during a given time period. Moreover, for sub-frame integration, more than one row of pixels can be reset during a given time period; for example, the pixel 104 and the pixel 108 can be concurrently reset within a particular time period. When sub-frame integration is effectuated, two (or more) rows of pixels being reset during a given time period each access disparate reset buses 112-114. Hence, the pixel 104 and the pixel 108 can be reset during a common time period since the pixel 104 accesses reset bus 112 and the pixel 108 accesses reset bus 114, while simultaneous resetting of pixels that access the same reset bus 112-114 (e.g., the pixel 104 and the pixel 106, the pixel 108 and the pixel 110, ...) can be prohibited.

By employing a plurality of reset buses 112-114, substantially similar analog signals can be provided to pixels regardless of integration mode. For instance, substantially similar currents can be supplied to each of the pixels in the pixel array 102 during reset, whether operating in full frame integration mode or sub-frame integration mode. Thus, by having the plurality of reset buses 112-114, separate current sources 116-118 can be provided for each pixel concurrently being reset to enable maintaining uniformity in pixel operation. In contrast, conventional techniques oftentimes provide a first current to pixels in the pixel array 102 during reset when employing full frame integration (e.g., since current from a common current source can flow from a common reset bus through one pixel, ...) and a second, lower current to pixels in the pixel array 102 during reset when utilizing sub-frame integration (e.g., since current from the common current source can flow from the common reset bus through more than one pixel resulting in the current being divided, ...). According to another illustration, the second, lower current provided to the pixels in the pixel array 102 during reset associated with sub-frame integration oftentimes can be amplified in conventional approaches; however, offsets and/or non-uniformity in gain can yield noticeable differences (e.g., due to fixed pattern noise, ...) in a resultant image as compared to an image yielded via employing full frame integration.

Pixels commonly can be reset by opening a circuit to a voltage source via digital control, which can yield kTC noise due to theoretically instantaneous current draw. Moreover, current draw from sources 116-118 respectively provided via reset buses 112-114 for resetting pixels in the pixel array 102 can be controlled over time to mitigate kTC noise. Current draw can be managed by employing tapered reset algorithms. However, conventional techniques can be unable to employ tapered reset with sub-frame integration since more than one row of pixels can be reset during a given time period, which can result in divided currents being provided to simultaneously reset pixels as described above. In contrast, the system 100 enables tapered reset to be employed with sub-frame integration by leveraging a plurality of reset buses 112-114, each coupled to a corresponding source 116-118. Further, digital control can manage pixel reset timing to allow pixels coupled to disparate reset buses 112-114 (and disparate sources 116-118) to be reset concurrently.

Following is an example description of pixel readout circuitry that can be employed in connection with system 100; yet, it is to be appreciated that the claimed subject matter is not so limited. An image focused on the pixel array 102 can cause the pixels to convert incident light into electrical energy. Signals obtained by the pixel array 102 can be processed on a column by column basis; thus, a particular row of pixels from the pixel array 102 can be selected to be read. During a readout cycle, each pixel can provide two voltages, and the difference between these two voltages can be measured. The read bus 120 (and/or any number of disparate read buses (not shown)) can transfer the contents from the pixels in the pixel array 102 in the selected row. According to an illustration, the system 100 can include N read buses, where each read bus can be associated with a respective column of the pixel array 102. By way of further example, pixels in the pixel array 102 can share read buses, and thus, the system 100 can include fewer than N read buses. Pursuant to another illustration, each column of the pixel array 102 can be associated with more than one read bus; hence, the system 100 can include more than N read buses.

Each read bus can carry content (e.g., sampled signals, ...) from the pixels to a respective column buffer (CB) (not shown). The system 100 can include N column buffers or fewer, for instance. The column buffers can amplify (e.g., condition, ...) the signals from the pixels. Further, each column buffer can enable low noise readout and can condition the signal from a pixel positioned at one of the rows in the column (or columns) corresponding to the column buffer.

After processing by the column buffers, outputted values from each of the column buffers can be retained. Moreover, each of the column buffers can be associated with respective circuitry (not shown) such as, for instance, a respective capacitor and switch. Such circuitry can sample and hold outputted values from the corresponding column buffers. For example, the capacitors can be loaded with the outputted values from the corresponding column buffers. Further, the switches can be closed one at a time to allow for connecting to a bus; thus, the voltages generated by the column buffers can be multiplexed over the bus. The bus can enable communicating each of the outputted values from the respective column buffers to an analog to digital converter (ADC) (not shown). The ADC can digitize the sampled signal to yield a digital signal. The digital signal can thereafter be provided to disparate component(s) (not shown) for further processing, manipulation, storage, display, and so forth.

Figure 2:
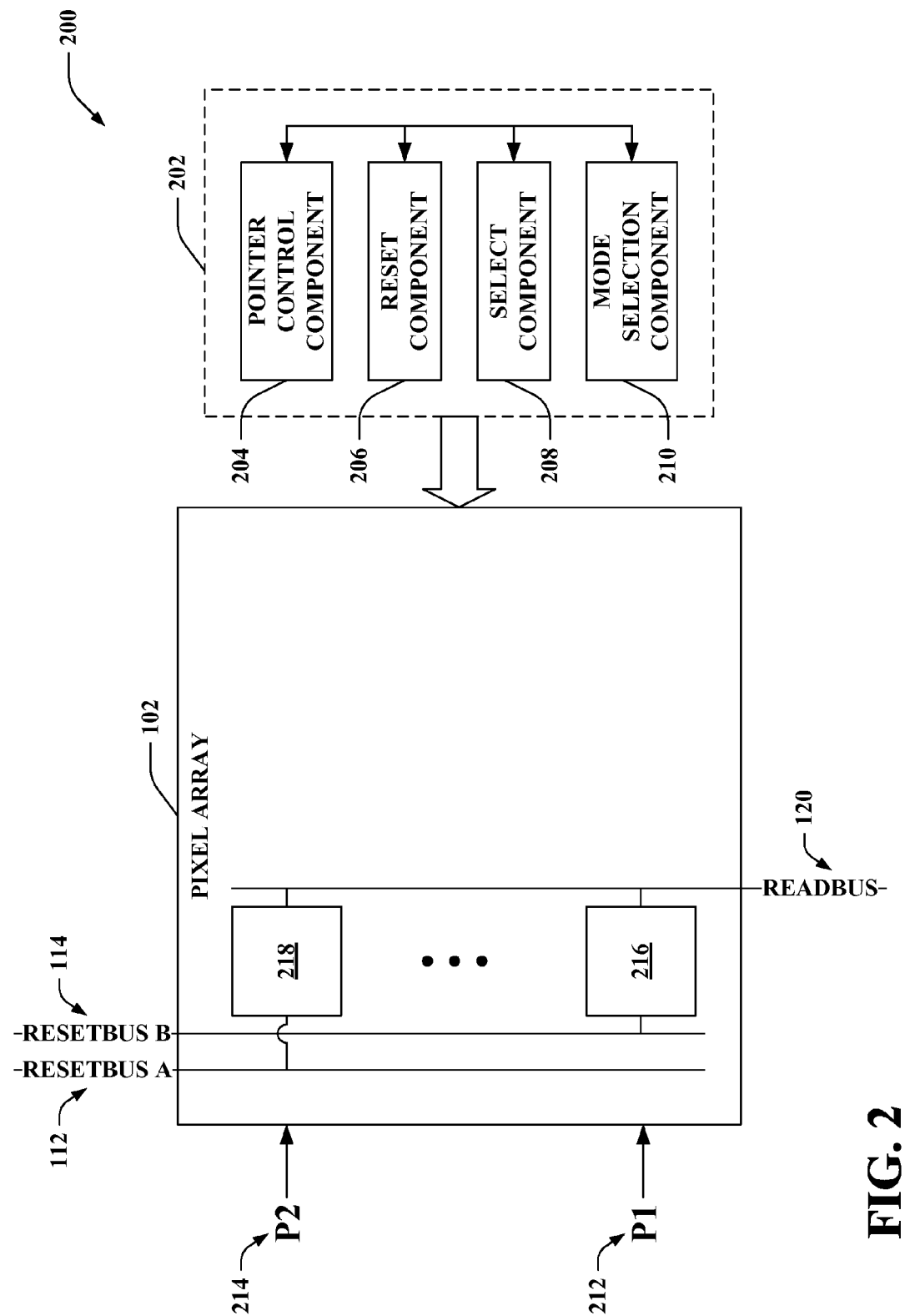
FIG. 2 illustrates an example system that controls pixel reset in a complementary metal-oxide-semiconductor (CMOS) sensor imager.

Turning to FIG. 2, illustrated is a system 200 that controls pixel reset in a complementary metal-oxide-semiconductor (CMOS) sensor imager. The system 200 includes the pixel array 102, two reset buses (e.g., reset bus A 112 and reset bus B 114, ...), and the read bus 120. The system 200 can further include digital control engine 202 that can manage the reset buses 112-114. The digital control engine 202 can also control reset related voltage sources and current sources (e.g., source A 116 and source B 118 of FIG. 1, . . . ). The digital control engine 202 can facilitate independently resetting more than one pixel from a given column during a common time interval when employing sub-frame integration. Although not shown, it is contemplated that separate, independent digital control engines, each of which can be substantially similar to the digital control engine 202, can be utilized to manage each of the reset buses 112-114.

The digital control engine 202 can include a pointer control component 204, a reset component 206, a select component 208, and a mode selection component 210. The pointer control component 204 can select rows to be read and reset during a given readout time interval based upon one or more criteria (e.g., based on integration mode, length of integration time, clock mode, scanning mode, resolution, predefined structure of the pixel array 102, . . . ). The pointer control component 204 can select a row number for a row of pixels from the pixel array 102 to be read during a given readout time interval. The row number corresponding to the row to be read can be chosen by the pointer control component 204 when leveraging full frame integration mode or sub-frame integration mode. Moreover, when operating in sub-frame integration mode, the pointer control component 204 can additionally select a second row number for a disparate row of pixels from the pixel array 102 to be reset during the given readout time interval. Further, when two row numbers are elected for the given readout time interval (e.g., for sub-frame integration mode, . . . ), the pointer control component 204 can inhibit selection of two rows that connect to the same reset bus (e.g., reset bus A 112 or reset bus B 114, . . . ). Thus, when a first row that is associated with a first reset bus is selected to be read during the given readout time interval, the pointer control component 204 can limit a subset of possible rows from which a second row to be reset during the given readout time interval can be selected; the subset of possible rows can include rows associated with a second reset bus. Similarly, when a first row that is associated with a first reset bus is chosen to be reset during the given readout time interval, the pointer control component 204 can limit a subset of possible rows from which a second row can be chosen to be rows associated with a second reset bus, where the second row can be read during the given readout time interval.

According to the depicted example, the pointer control component 204 can select, assign, etc. a first pointer (e.g., P1 212, read pointer, . . . ) to a first row of pixels from the pixel array 102 and a second pointer (e.g., P2 214, reset pointer, . . . ) to a second row of pixels from the pixel array 102. In a particular column, a pixel 216 in the row corresponding to P1 212 can connect to the reset bus B 114 and a pixel 218 in the row corresponding to P2 214 can connect to the reset bus A 112. Thus, the pixel 216 and the pixel 218 are coupled to disparate reset buses 112-114 as managed by the pointer control component 204. Further, an integration time can be a function of a distance between the two pointers 212-214. It is to be appreciated that substantially any length of the integration time can be set based upon the selection of the pointers 212-214 effectuated by the pointer control component 204, the length of the integration time can be varied by the pointer control component 204, and so forth.

Moreover, the pointer control component 204 can advance the pointers 212-214 through the pixel array 102. The pointers 212-214 can be looped through the pixel array 102 by the pointer control component 204 with the same frequency. For example, during a first readout time interval, P1 212 can be allotted to row 105 and P2 214 can be assigned to row 107, while during a next readout time interval, P1 212 can be advanced to row 104 and P2 214 can be advanced to row 106; however, the claimed subject matter is not limited to the aforementioned example. In view of the foregoing, the pointer control component 204 can maintain the assignments of pointers 212-214 to ensure that pixels in two rows do not attempt to concurrently access the same reset bus during a given time period. Thus, the pointer control component 204 can constrain selection of rows to be read and reset to inhibit more than one pixel in a column from concurrently accessing a common reset bus during the given time period.

Further, the reset component 206 can generate, initiate transmission of, send, a combination thereof, etc. reset signal(s) to reset transistor(s) (e.g., gate(s) of the reset transistor(s), . . . ) of pixel(s) included in the pixel array 102 during a given time period. For instance, when a reset signal is provided to a reset transistor of a pixel in the pixel array 102, a floating diffusion region of the pixel can be connected to a corresponding reset bus (e.g., reset bus A 112 or reset bus B 114, . . . ), which allows a reset pulse from a reset supply (e.g., source A 116 or source B 118 of FIG. 1, . . . ) to be provided to the floating diffusion region. Further, at times when the reset signal is not supplied to the reset transistor, the pixel can lack a connection between the floating diffusion region and the respective reset bus 112-114. Moreover, the select component 208 can yield, instigate conveyance of, transfer, a combination thereof, etc. select signal(s) to select transistor(s) (e.g., gates of the select transistor(s), . . . ) of pixel(s) included in the pixel array 102 during a particular time period. For instance, a select signal can initiate readout of a pixel.

Moreover, the mode selection component 210 can choose an integration mode and/or effectuate utilizing a chosen integration mode in connection with the pixel array 102. For instance, the mode selection component 210 can control whether full frame integration mode or sub-frame integration mode is employed by the system 100. The mode selection component 210 can set the mode to be utilized by the system 100 prior to operation, alter the mode during operation, and so forth.

The mode selection component 210 can obtain an input related to, effectuate operation utilizing, transition to, a combination thereof, etc. a particular integration mode. According to an example, the mode selection component 210 can receive an input (e.g., via an interface (not shown), from a user, automatically based upon a condition associated with the system 200, . . . ) related to a selection of a particular integration mode from a set of possible integration modes (e.g., the set of possible integration modes can include full frame integration mode, sub-frame integration mode, . . . ). Following this example, the mode selection component 210 can enable employing the selected integration mode. Further, regardless of the integration mode effectuated by the mode selection component 210, the pointer control component 204 can manage the pointer(s) (e.g., P1 212 and/or P2 214, . . . ) to ensure that if more than one row of pixels is concurrently reset, then the concurrently reset rows connect to different reset buses 112-114 during any given time interval.

Pixels in the pixel array 102 can be read out after an integration time (e.g., which can be dependent upon the integration mode, . . . ). For instance, one row at a time can be read out (e.g., from bottom to top of the pixel array 102, from top to bottom of the pixel array 102, . . . ). In full frame integration mode, a row of pixels can be sent a select signal and a reset signal during a corresponding, unique readout time interval (e.g., a select signal and a reset signal can be transmitted to a disparate row of pixels during a disparate corresponding, unique readout time interval, . . . ). Further, the pointer control component 204 can control the row of pixels from the pixel array 102 to be read out and reset during each unique readout time interval. When operating in full frame integration mode, each pixel in the pixel array 102 can be integrated or exposed to light at times other than when such pixel is being read out or reset. For instance, full frame integration mode can leverage utilization of one pointer (e.g., P1 212, ... ). This pointer (e.g., P1 212, ... ) can correspond to a given row that is read out and reset during a unique readout time interval. Thus, the pointer can loop through the pixel array 102 to allow for reading out and resetting disparate rows at disparate, unique readout time intervals (e.g., P1 212 can point to row 100 at a first unique readout time interval, row 101 at a second unique readout time interval, ... ).

During a given unique readout time interval in full frame integration mode, the select component 208 can provide a select signal to a particular row corresponding to P1 212 to enable reading out values obtained by pixels in the particular row. When the select signal is provided to a particular pixel (e.g., the pixel 216 in the particular row corresponding to P1 212, ... ), a floating diffusion region of that particular pixel can be read out via the read bus 120 by allowing charge transfer from the particular pixel. Moreover, the reset component 206 can control transfer of a reset signal to the particular row corresponding to P1 212. Upon obtaining the reset signal at a reset transistor of the particular pixel (e.g., the pixel 216, ... ), the floating diffusion region of the particular pixel can be connected to a corresponding one of the reset buses 112-114 (e.g., the pixel 216 can be connected to the reset bus B 114, ... ). When connected to the corresponding one of the reset buses 112-114, a reset pulse can be sent to the floating diffusion region of the particular pixel. Moreover, after the particular row of pixels is reset, values stored in the floating diffusion regions can be read out a second time (e.g., to read reset values for each of the pixels in the particular row corresponding to P1 212, ... ). Hence, the select component 208 can again transfer the select signal to the particular row corresponding to P1 212. This second readout can be utilized to determine a differential voltage associated with each of the pixels in the particular row. Upon ascertaining the differential voltage, the pointer (e.g., P1 212, ... ) can be advanced (e.g., to a next row to be read out and reset, ... ), and so forth According to another illustration, in sub-frame integration mode, a first row of pixels can be read out during a corresponding, unique readout time interval while a second row of pixels can be reset during the same corresponding, unique readout time interval. The pointer control component 204 can coordinate and identify the first row and the second row of pixels from the pixel array 102. When operating in sub-frame integration mode, two pointers (e.g., P1 212 and P2 214, ... ) can be employed. P1 212 can be referred to as a read pointer and P2 214 can be referred to as a reset pointer. Thus, P1 212 can correspond to a first row of the pixel array 102 that is being read out and reset during a unique readout time interval, while P2 214 can correspond to a second row of the pixel array 102 that is additionally being reset during this unique readout time interval. An integration time for sub-frame integration mode can be a function of a distance between the two pointers, P1 212 and P2 214. Further, both P1 212 and P2 214 can loop through the pixel array 102 at the same frequency as maintained by the pointer control component 204.

During a given unique readout time interval in sub-frame integration mode, the select component 208 can transfer a select signal to the first row corresponding to P1 212 to enable reading out values obtained by pixels in the first row. For instance, the select signal can be provided to the pixel 216, thereby allowing the floating diffusion region of the pixel 216 to be read out via the read bus 120. Further, the reset component 206 can send a reset signal to the first row corresponding to P1 212. Upon obtaining the reset signal at the reset transistor of the pixel 216, for example, the floating diffusion region of this pixel 216 can be connected to the reset bus B 114 to cause the floating diffusion region to return to a reset value. Further, the select component 208 can again transfer the select signal to the first row corresponding to P1 212 to allow for determining differential voltages from pixels in the first row. Additionally, during the given unique readout time interval, the reset component 120 can transfer a reset signal to the second row corresponding to P2 214. By way of illustration, the pixel 218 in the second row can obtain the reset signal at a reset transistor included therein, and the reset signal can cause a floating diffusion region of the pixel 218 to be connected to the reset bus A 112. Thus, the pixel 216 and the pixel 218 can each connect to different reset buses 112-114 within the given unique readout time interval. When connected to the reset bus A 112, a reset pulse can be sent to the floating diffusion region of the pixel 218. Further, the pointers, P1 212 and P2 214, can be advanced within the pixel array 102 by the pointer control component 204, and so forth.

Figure 3:
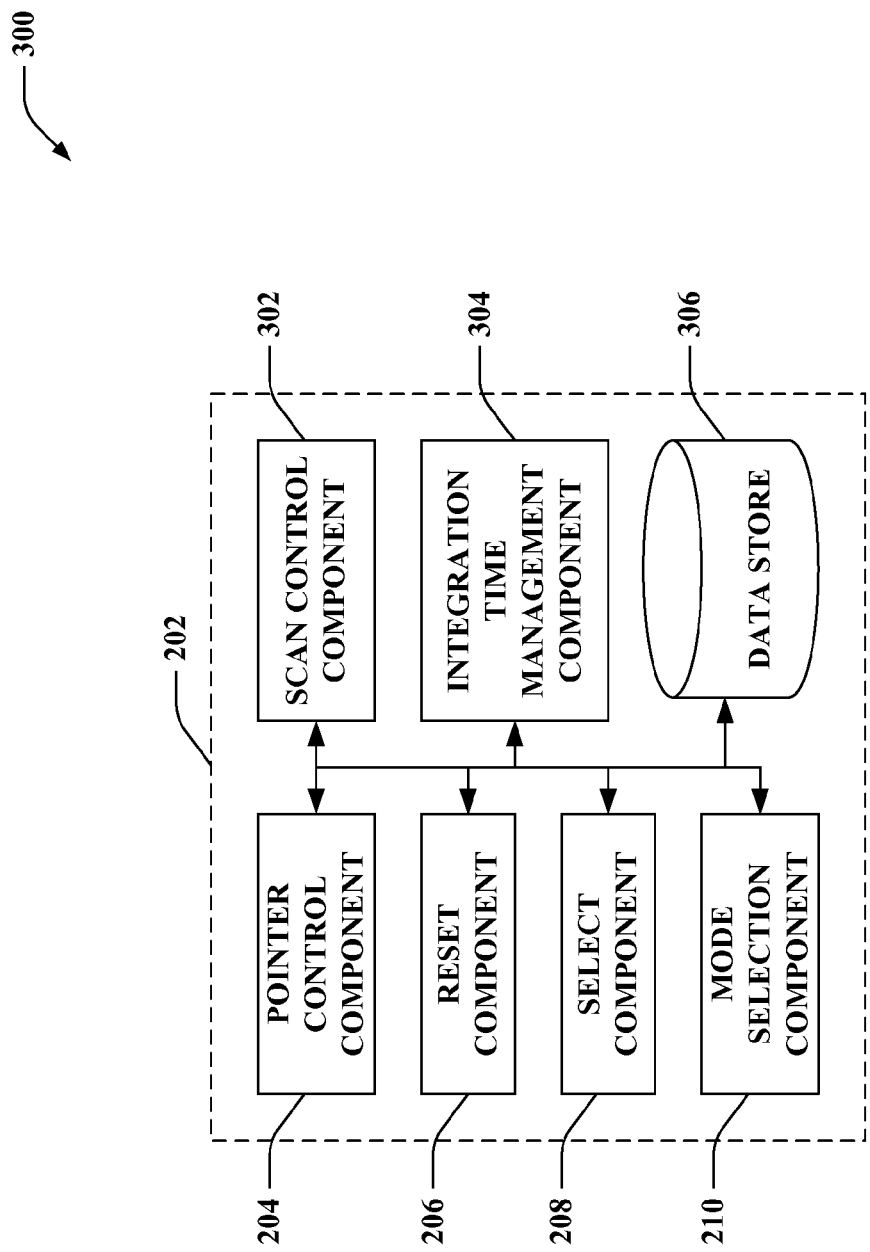
FIG. 3 illustrates an example system that controls selection of row(s) from a pixel array to be reset during a given readout time interval.

Now referring to FIG. 3, illustrated is a system 300 that controls selection of row(s) from a pixel array to be reset during a given readout time interval. The system 300 includes the digital control engine 202, which can manage selection of row(s) from a pixel array (e.g., the pixel array 102 of FIG. 1, ... ) to be read and reset by utilizing the pointer control component 204. For instance, the pointer control component 204 can control selection of a combination of rows to be read and reset (e.g., for sub-frame integration, ... ) during a particular readout time interval based upon one or more criteria. The digital control engine 202 can further include the reset component 206, the select component 208 and the mode selection component 210 as described herein.

Moreover, the digital control engine 202 can include a scan control component 302, an integration time management component 304, and a data store 306. The scan control component 302 can effectuate utilizing progressive scanning mode or interlaced scanning mode in connection with reading out and resetting pixels in the pixel array. Hence, a criterion leveraged by the pointer control component 204 when choosing the combination of rows to be read and reset during a particular readout time interval can be whether progressive scanning mode or interlaced scanning mode is employed by the scan control component 302. For instance, when the scan control component 302 implements progressive scanning mode, each row of pixels from the pixel array can be read out. In progressive scanning mode, a first row can be read out, then a second row that is adjacent to the first row can be read out, and so forth. According to another illustration, the scan control component 302 can employ interlaced scanning mode, where every other row can be alternatively read out (e.g., read out odd rows, then read out even rows, ... ). For example, for interlaced scanning mode, a first row can be read out, a second row that is adjacent to the first row can be skipped, a third row that is adjacent to the second row can be readout, a fourth row that is adjacent to the third row can be skipped, and so forth. Moreover, pursuant to this example, the process can be repeated such that the first row can be skipped, the second row can be read out, the third row can be skipped, the fourth row can be read out, and so forth. Further, regardless of the type of scan implemented by the scan control component 302 (e.g., progressive scanning mode versus interlaced scanning mode, ... ), the pointer control component 204 can prohibit selection of two rows that access a common reset bus during the particular readout time interval. According to an additional example, the scan control component 302 can alter the type of scan during operation, and the pointer control component 204 can control the selection of rows based upon the altered type of scan utilized thereby.

Moreover, the integration time management component 304 can control a length of integration time when operating in sub-frame integration mode. The length of integration time can be a distance (e.g., number of rows, . . . ) between a read pointer and a reset pointer. The distance between pointers can be referred to as an integration counter; however, the claimed subject matter is not so limited. For instance, the integration time management component 304 can allow two rows to be a minimum length of integration time. Further, the integration time management component 304 can enable larger lengths of integration time to be utilized. Shorter versus longer lengths of integration time can depend upon an amount of exposure (e.g., longer length of integration time can be utilized in dim conditions, . . . ). Thus, a length of integration time employed by the integration time management component 304 can be a criterion leveraged by the pointer control component 204 when choosing the combination of rows to be read and reset during a particular readout time interval. Hence, the pointer control component 204 can cause two rows on different buses to be chosen regardless of the length of integration time set by the integration time management component 304. By way of example, the integration time management component 304 can set a distance between a read pointer and a reset pointer, while the pointer control component 204 can constrain the read pointer and the reset pointer to both be on even rows or both be on odd rows.

It is contemplated that the pointer control component 204 can employ one criterion or a plurality of criteria when selecting rows to be read and reset during a given readout time interval. Moreover, other example criteria can relate to clock mode, resolution, a predefined structure of an overall pixel array that includes two distinct read buses, and so forth. Further, the pointer control component 204 can manage selecting rows to be read and reset while one or more of the criteria are altered (e.g., during operation, . . . ).

The pointer control component 204, for instance, can retain the value(s) for the one or more pointers in the data store 306. Moreover, instructions utilized by the pointer control component 204, the reset component 206, the select component 208, the mode selection component 210, the scan control component 302, and/or the integration time management component 304 can be retained in and retrieved from the data store 306. The data store 306 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 306 of the subject systems and methods is intended to comprise, without being limited to, these and any other suitable types of memory. In addition, it is to be appreciated that the data store 306 can be a server, a database, a hard drive, and the like.

Figure 4:
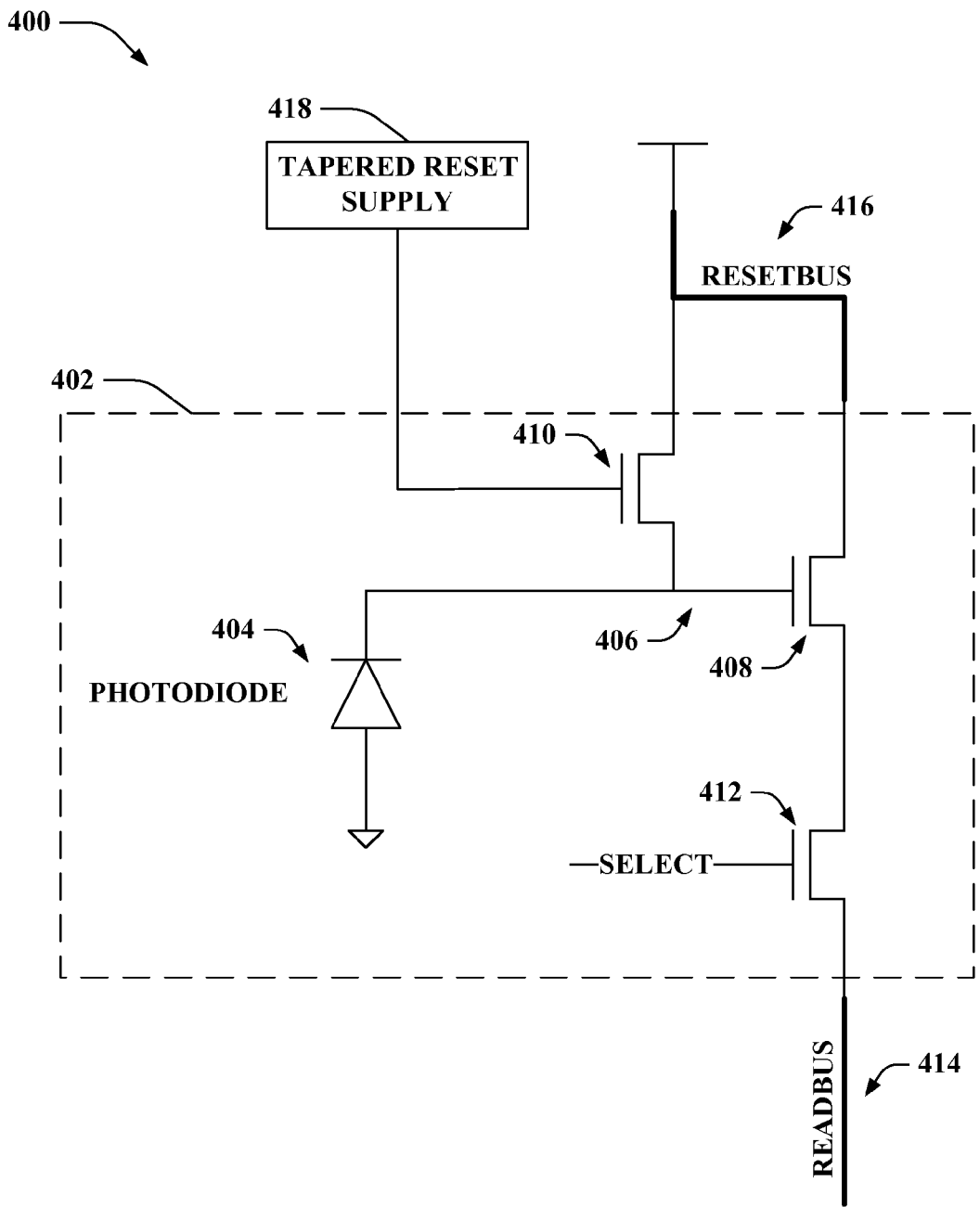
FIG. 4 illustrates an example system comprising a complementary metal-oxide-semiconductor (CMOS) imager pixel cell that can be included in a pixel array.

Now turning to FIG. 4, illustrated is an example system 400 comprising a complementary metal-oxide-semiconductor (CMOS) imager pixel cell 402 that can be included in a pixel array (e.g., the pixel array 102 of FIG. 1). The pixel cell 402 includes a photodiode 404 connected to a floating diffusion region 406. The floating diffusion region 406 connects to a source follower transistor 408 and a reset transistor 410. The source follower transistor 408 is further connected to a select transistor 412. The select transistor 412 can be employed to select a particular row of pixel cells from a pixel array. For instance, a select signal (e.g., yielded by the select component 208 of FIG. 2, . . . ) can be received at a gate of the select transistor 412 to read out a value from the floating diffusion region 406. As depicted, the pixel cell 402 can be a 3T pixel cell utilized in a CMOS iSoC; however, it is to be appreciated that the claimed subject matter is not so limited. One skilled in the art would appreciate that the discussion herein can be applied to different pixel configurations such as, for instance, a pixel configuration that includes a transfer gate transistor between the photodiode 404 and the floating diffusion region 406 (e.g., a 4T pixel cell, . . . ).

The photodiode 404 can be charged by converting optical energy to electrical energy. For instance, the photodiode 404 can have sensitivity to a particular type of incident light (e.g., red light, blue light, green light, . . . ). Moreover, the type of light to which the photodiode 404 is sensitive can indicate a type of the pixel cell 402 (e.g., R pixel, B pixel, G pixel, . . . ).

According to an illustration, the floating diffusion region 406 can be reset to a known state before transfer of charge to it. Resetting of the floating diffusion region 406 can be effectuated by the reset transistor 410. For example, a reset signal (e.g., from the reset component 206 of FIG. 2, . . . ) can be received at a gate of the reset transistor 410 to cause resetting of the floating diffusion region 406. Further, the floating diffusion region 406 can collect charge yielded by the photodiode 404. Light can be integrated at the photodiode 404 and electrons generated from the light can be transferred to the floating diffusion region 406 (e.g., in a noiseless or substantially noiseless manner). Moreover, the pixel cell 402 (along with other pixel cell(s) in the same row of the pixel array) can be selected for readout by employing the select transistor 412. Readout can be effectuated via a read bus 414 (e.g., the read bus 120 of FIG. 1, . . . ). Further, the source follower transistor 408 can output and/or amplify a signal representing a reset voltage (e.g., provided via a reset bus) and a pixel signal voltage based on the photo converted charges.

The CMOS imager pixel cell 402 can be in a first row of pixels that is read and reset or in a second row of pixels that is reset only when sub-frame integration is implemented. When the CMOS imager pixel cell 402 is in the first row that is read and reset, a select signal can be received at the select transistor 412 to effectuate reading out the pixel signal voltage, a reset signal can be obtained at the reset transistor 410 to reset the floating diffusion region 406, and the reset voltage at the floating diffusion region 406 can be read out by receiving another select signal at the select transistor 412. Further, when the CMOS imager pixel cell 402 is in the second row that is reset without being read out, a reset signal can be obtained at the reset transistor 410 to reset the floating diffusion region 406.

Moreover, the pixel cell 402 can be connected to a reset bus 416. The reset bus 416 can be one of a plurality of reset buses (e.g., one of the reset bus A 112 or the reset bus B 114 of FIG. 1, . . . ); thus, the pixel cell 402 can be reset via the reset bus 416 during a particular readout time interval, while a disparate pixel cell (not shown) can be reset via a disparate reset bus during the particular readout time interval. Accordingly, the pixel cell 402 need not share the reset bus 416 when operating in sub-frame integration mode. Further, the system 400 can include a tapered reset supply 418 that can provide a tapered reset signal to a gate of the reset transistor 410. The tapered reset signal can be applied to the reset transistor 410 within the pixel cell 402 to reduce reset noise.

The pixel cell 402 can have a capacitance at the photodiode 404 that defines a conversion gain. The diode capacitance can be on the order of femto farads. In tapered reset, resetting of the floating diffusion region 406 can cause noise (e.g., kTC noise, . . . ). Further, since system 400 can be included in a CMOS sensor imager, removing such noise can be difficult because CMOS sensor imagers commonly do not use full frame memory, and thus typically do not store a reset value at a certain frame, in contrast to charge-coupled device (CCD) imagers. To account for the foregoing, the floating diffusion region 406 can be reset using negative feedback provided by the Miller capacitance of the source follower transistor 408. Due to the gain of the device, the Miller capacitance can be on the order of 10-100 ado farads, and hence, the capacitance that define the kTC noise can be lowered, which in turn can reduce noise. Low-noise reset of the floating diffusion region 406 can be performed by applying the tapered reset waveform from the tapered reset supply 418 to the gate of the reset transistor 410. The source follower transistor 408 can act as a transconductance, and the reset transistor 410 can act as a resistance controlled by the tapered reset waveform. The series resistance of the reset transistor 410 can gradually increase by applying slowly a decreasing ramp waveform from the tapered reset supply 418 to the gate of the reset transistor 410 to give the feedback transconductance of the source follower transistor 408 the opportunity to null the reset noise.

Figure 5:
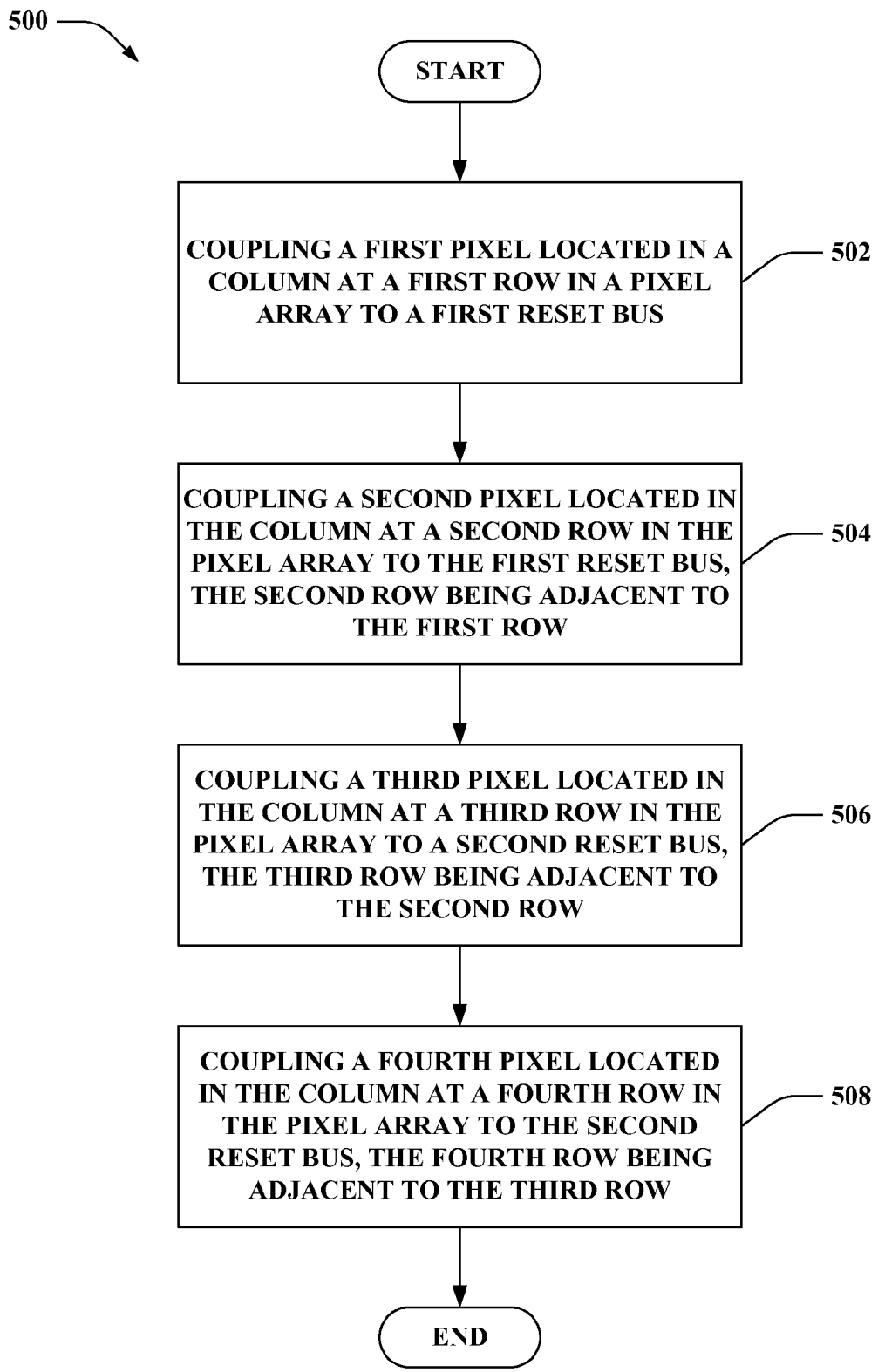
FIG. 5 illustrates an example methodology that facilitates forming a pixel array of a complementary metal-oxide-semiconductor (CMOS) sensor imager.
Figure 6:
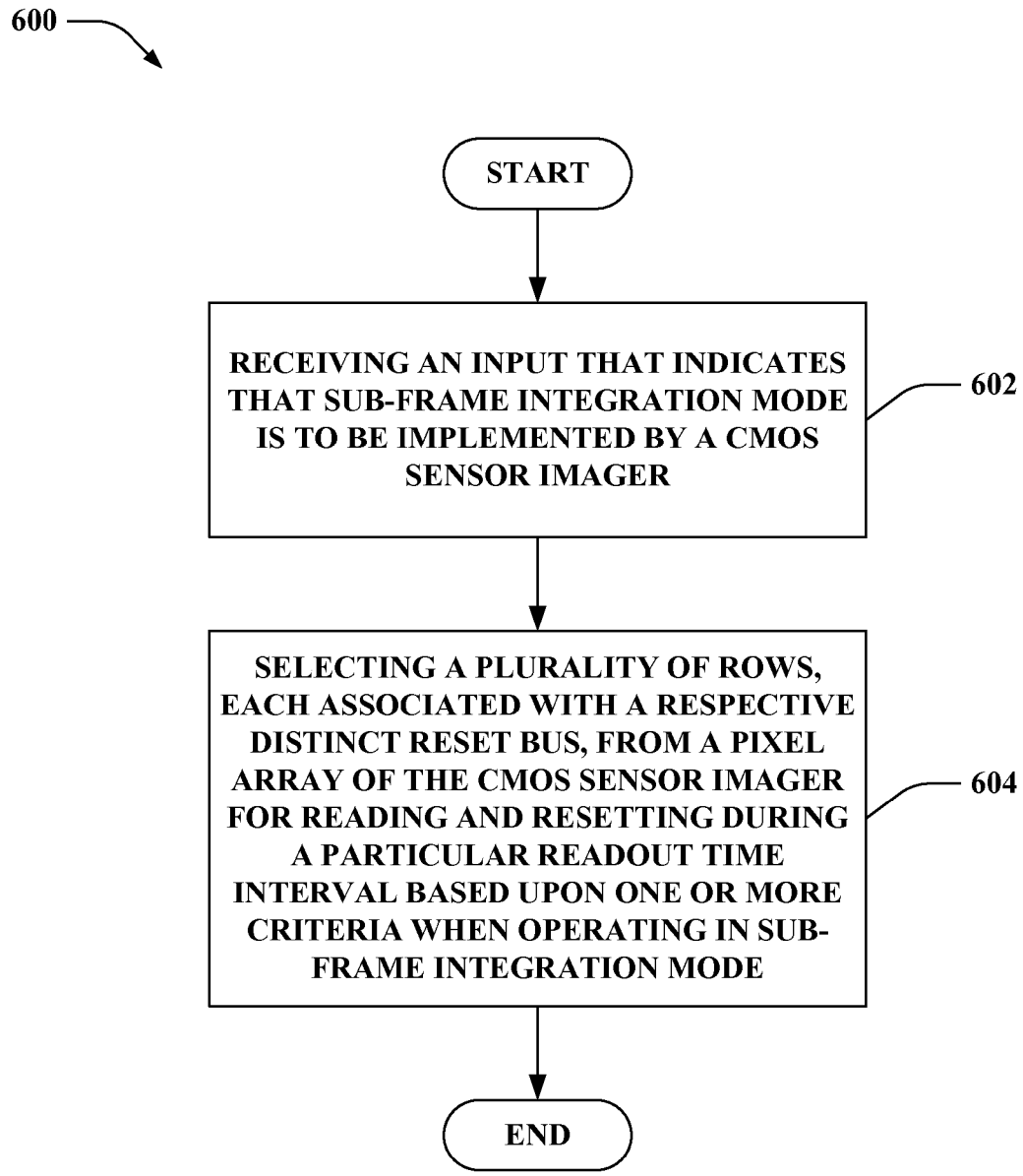
FIG. 6 illustrates an example methodology that facilitates mitigating noise introduced during pixel reset in a complementary metal-oxide-semiconductor (CMOS) sensor imager.
Figure 7:
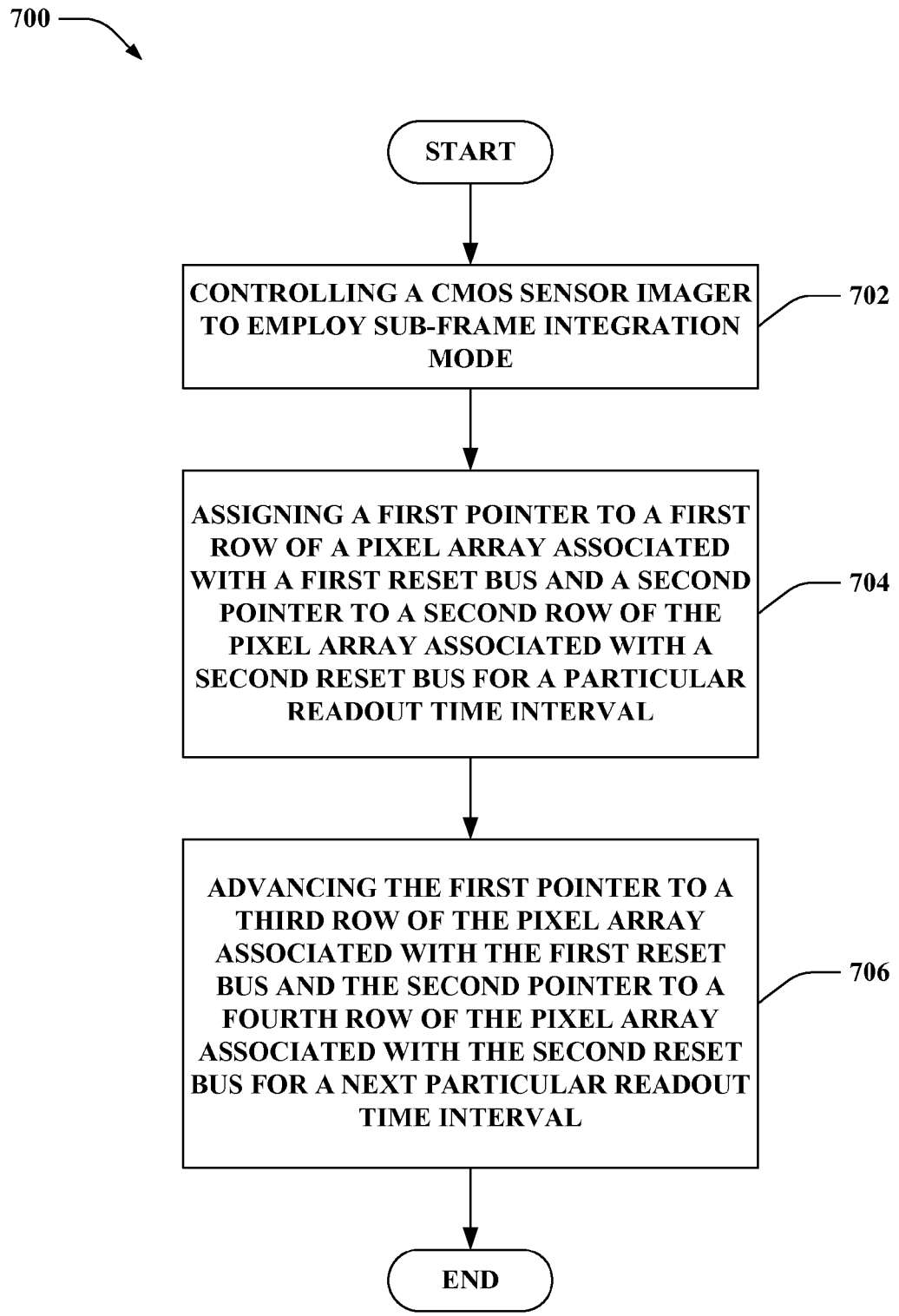
FIG. 7 illustrates an example methodology that facilitates utilizing independent reset buses for a complementary metal-oxide-semiconductor (CMOS) sensor imager.

FIGS. 5-7 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 5, illustrated is a methodology 500 that facilitates forming a pixel array of a complementary metal-oxide-semiconductor (CMOS) sensor imager. At 502, a first pixel located in a column at a first row in a pixel array can be coupled to a first reset bus. At 504, a second pixel located in the column at a second row in the pixel array can be coupled to the first reset bus. Moreover, the second row can be adjacent to the first row. At 506, a third pixel located in the column at a third row in the pixel array can be coupled to a second reset bus. Further, the third row can be adjacent to the second row. At 508, a fourth pixel located in the column at a fourth row in the pixel array can be coupled to the second reset bus. The fourth row, for instance, can be adjacent to the third row.

Additionally, it is to be appreciated that the aforementioned pattern can be repeated. According to an example, a fifth pixel located in the column at a fifth row in the pixel array can be coupled to the first reset bus, where the fifth row can be adjacent to the fourth row. Further, a sixth pixel located in the column at a sixth row in the pixel array can be coupled to the first reset bus, where the sixth row can be adjacent to the fifth row. Moreover, a seventh pixel located in the column at a seventh row in the pixel array can be coupled to the second reset bus, where the seventh row can be adjacent to the sixth row. Additionally, an eighth pixel located in the column at an eighth row in the pixel array can be coupled to the second reset bus, where the eighth row can be adjacent to the seventh row. It is contemplated that the aforementioned pattern can be extended to an entire pixel array.

One or more of the pixels can be included in a visible portion of the pixel array. By way of another illustration, it is contemplated that one or more of the pixels can be included in a vertical blanking portion of the pixel array.

Now turning to FIG. 6, illustrated is a methodology 600 that facilitates mitigating noise introduced during pixel reset in a complementary metal-oxide-semiconductor (CMOS) sensor imager. At 602, an input that indicates that sub-frame integration mode is to be implemented by a CMOS sensor imager can be received. For instance, the input can transition the CMOS sensor imager to sub-frame integration mode from full frame integration mode. By way of example, the input can be received prior to operation of the CMOS sensor imager, during operation of the CMOS sensor imager (e.g., causing on the fly transitioning between integration modes, . . . ), and so forth.

At 604, a plurality of rows, each associated with a respective distinct reset bus, from a pixel array of the CMOS sensor imager can be selected for reading and resetting during a particular readout time interval based upon one or more criteria when operating in sub-frame integration mode. Accordingly, selection of the plurality of rows can be constrained such that each of the plurality of rows as selected accesses a different reset bus during the particular readout time interval. Moreover, the one or more criteria can include at least one of an integration mode, a length of integration time, a clock mode, a scanning mode (e.g., progressive scanning mode versus interlaced scanning mode, . . . ), a resolution, a predefined structure of the pixel array, and so forth. By way of another example, a value of at least one of the one or more criteria can change over time (e.g., the length of integration time, clock mode, scanning mode, resolution, etc. can be altered, . . . ).

Referring to FIG. 7, illustrated is a methodology 700 that facilitates utilizing independent reset buses for a complementary metal-oxide-semiconductor (CMOS) sensor imager. At 702, a CMOS sensor imager can be controlled to employ sub-frame integration mode. At 704, a first pointer can be assigned to a first row of a pixel array associated with a first reset bus and a second pointer can be assigned to a second row of the pixel array associated with a second reset bus for a particular time interval. For instance, a combination of the first pointer and the second pointer can be assigned based upon one or more criteria (e.g., an integration mode, a length of integration time, a clock mode, a scanning mode, a resolution, a predefined structure of the pixel array, . . . ). Further, the first pointer can identify pixels to be read and the second pointer can identify pixels to be reset. At 706, the first pointer can be advanced to a third row of the pixel array associated with the first reset bus and the second pointer can be advanced to a fourth row of the pixel array associated with the second reset bus for a next particular readout time interval.

Figure 8:
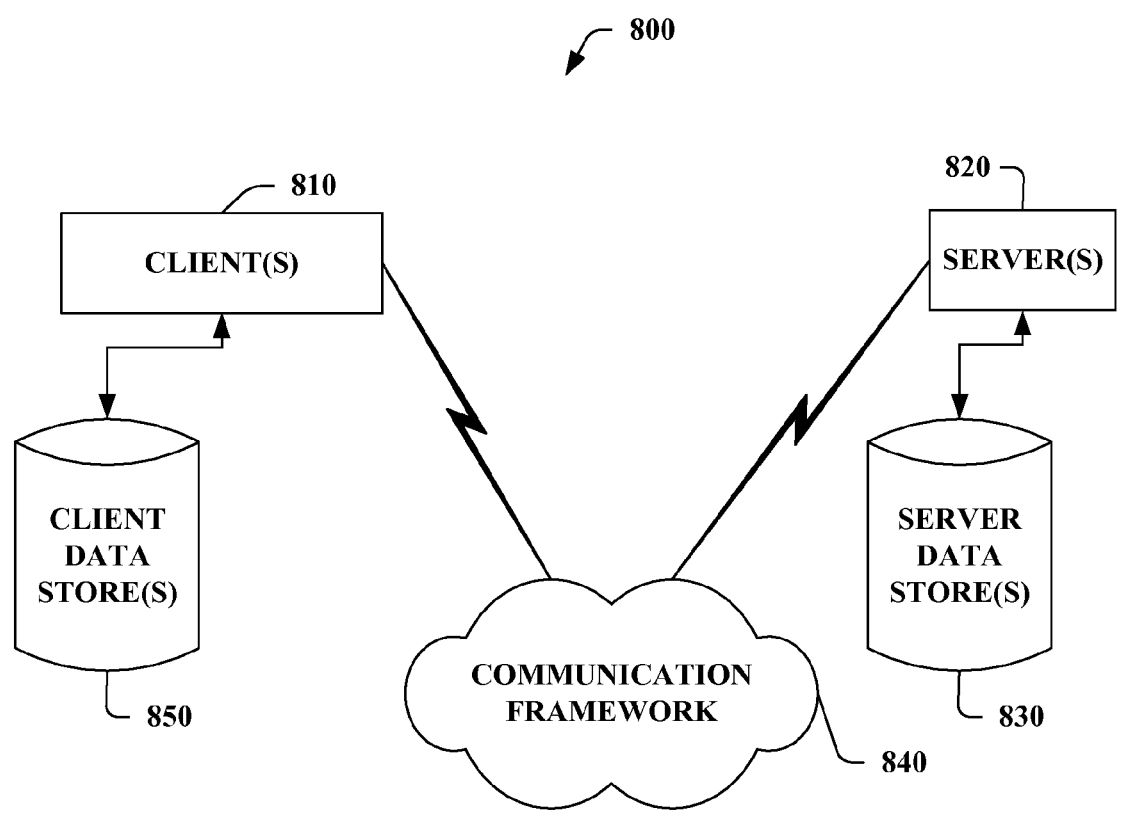
FIG. 8 illustrates an example networking environment, wherein the novel aspects of the claimed subject matter can be employed.
Figure 9:
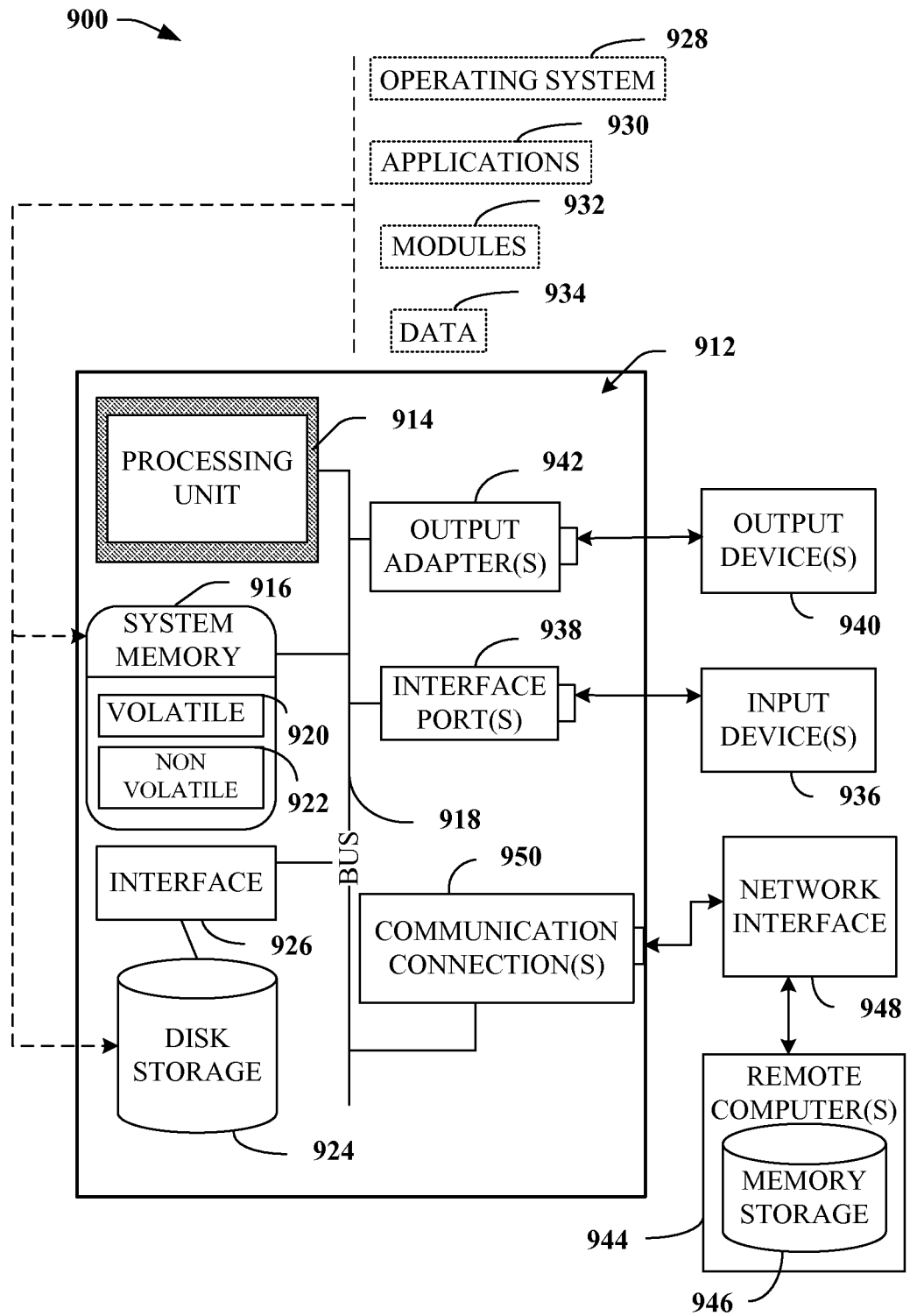
FIG. 9 illustrates an example operating environment that can be employed in accordance with the claimed subject matter.

In order to provide additional context for implementing various aspects of the claimed subject matter, FIGS. 8-9 and the following discussion is intended to provide a brief, general description of a suitable computing environment in which the various aspects of the subject innovation may be implemented. For instance, FIGS. 8-9 set forth a suitable computing environment that can be employed in connection with selecting rows to be read and reset while employing sub-frame integration mode within CMOS sensor imagers.

While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 8 is a schematic block diagram of a sample-computing environment 800 with which the claimed subject matter can interact. The system 800 includes one or more client(s) 810. The client(s) 810 can be hardware and/or software (e.g., threads, processes, computing devices). The system 800 also includes one or more server(s) 820. The server(s) 820 can be hardware and/or software (e.g., threads, processes, computing devices). The servers 820 can house threads to perform transformations by employing the subject innovation, for example.

One possible communication between a client 810 and a server 820 can be in the form of a data packet adapted to be transmitted between two or more computer processes. The system 800 includes a communication framework 840 that can be employed to facilitate communications between the client(s) 810 and the server(s) 820. The client(s) 810 are operably connected to one or more client data store(s) 850 that can be employed to store information local to the client(s) 810. Similarly, the server(s) 820 are operably connected to one or more server data store(s) 830 that can be employed to store information local to the servers 820.

With reference to FIG. 9, an exemplary environment 900 for implementing various aspects of the claimed subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), or flash memory. Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in the suitable operating environment 900. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the claimed subject matter can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that resets pixels in a complementary metal-oxide-semiconductor (CMOS) sensor imager, comprising:
   a pixel array;
   a first reset bus connected to a first pair of pixels in adjacent rows in a column of the pixel array and a second pair of pixels in adjacent rows in the column of the pixel array; and
   a second reset bus connected to a third pair of pixels in adjacent rows in the column of the pixel array and a fourth pair of pixels in adjacent rows in the column of the pixel array,
   wherein the first pair of pixels is adjacent to the third pair of pixels and the second pair of pixels is adjacent to the fourth pair of pixels.

2. The system of claim 1, further comprising:
   a first current source coupled to the first reset bus; and
   a second current source coupled to the second reset bus.

3. The system of claim 1, wherein the first reset bus and the second reset bus are independent.

4. The system of claim 1, further comprising a pointer control component that selects a first set of rows of the pixel array to be read and a second set of rows of the pixel array to be reset during a readout time interval based upon one or more criteria.

5. The system of claim 4, wherein the pointer control component selects the first set of rows to include only rows connected to the first reset bus and selects the second set of rows to include only rows connected to the second reset bus.

6. The system of claim 4, wherein the one or more criteria include at least one of a mode of the CMOS sensor imager, a length of integration time, a clock mode, a scanning mode, a resolution, or a structure of the pixel array.

7. The system of claim 1, further comprising a scan control component that effectuates utilizing one of a progressive scanning mode or an interlaced scanning mode.

8. A system that controls pixel reset in a complementary metal-oxide-semiconductor (CMOS) sensor imager, comprising:
   a pixel array;
   a plurality of reset buses coupled to mutually exclusive subsets of pixels in a column of the pixel array; and
   a pointer control component that selects rows of the pixel array to be read and reset during a given readout time interval based upon one or more criteria, wherein the pointer control component is configured to:
   select, for a first readout time interval, a first row of the pixel array associated with a first reset bus of the plurality of reset busses and a second row of the pixel array associated with a second reset bus of the plurality of reset busses; and
   select, for a second readout time interval subsequent to the first readout time interval, a third row of the pixel array associated with the first reset bus and a fourth row of the pixel array associated with the second reset bus.

9. The system of claim 8, wherein the pointer control component is further configured to select the first row of the pixel array to be read during the first readout time interval and the second row of the pixel array to be reset during the first readout time interval, wherein a first pixel located in the column at the first row is coupled to the first reset bus and a second pixel located in the column at the second row is coupled to the second reset bus.

10. The system of claim 8, wherein the one or more criteria include at least one of an integration mode, a length of integration time, a clock mode, a scanning mode, a resolution, or a structure of the pixel array.

11. The system of claim 10, further comprising a mode selection component that sets the integration mode as one of a full frame integration mode or a sub-frame integration mode.

12. The system of claim 11, wherein the mode selection component alters the integration mode during operation of the CMOS sensor imager.

13. The system of claim 10, further comprising a scan control component that effectuates utilizing one of a progressive scanning mode or an interlaced scanning mode.

14. The system of claim 10, further comprising an integration time management component that controls the length of integration time when operating in sub-frame integration mode.

15. The system of claim 8, wherein the pointer control component constrains selection of the rows to be read and reset to inhibit more than one pixel in the column from concurrently accessing a common one of the plurality of reset buses during the given readout time interval.

16. A method that facilitates mitigating noise introduced during pixel reset in a complementary metal-oxide-semiconductor (CMOS) sensor imager, comprising:
receiving an input that indicates that a sub-frame integration mode is to be implemented by a CMOS sensor imager;
selecting a plurality of rows, each of the plurality of rows associated with a respective distinct reset bus, from a pixel array of the CMOS sensor imager for reading and resetting during a readout time interval based upon one or more criteria when operating in the sub-frame integration mode;
assigning a first pointer to a first row of the pixel array associated with a first reset bus for the readout time interval when employing the sub-frame integration mode;
assigning a second pointer to a second row of the pixel array associated with a second reset bus for the readout time interval when employing the sub-frame integration mode;
advancing the first pointer to a third row of the pixel array associated with the first reset bus for a next readout time interval; and
advancing the second pointer to a fourth row of the pixel array associated with the second reset bus for the next readout time interval.

17. The method of claim 16, wherein the one or more criteria include at least one of an integration mode, a length of integration time, a clock mode, a scanning mode, a resolution, or a predefined structure of the pixel array.

18. The method of claim 17, wherein a value of at least one of the one or more criteria changes over time.

19. The method of claim 16, wherein the first pointer identifies pixels to be read and the second pointer identifies pixels to be reset.

20. The method of claim 16, further comprising constraining selection of the plurality of rows wherein a first sit of rows selected to be read and a second set of rows selected to be reset access a different reset bus during the readout time interval.

* * * * *